US006524988B2

(12) United States Patent
Speca

(10) Patent No.: US 6,524,988 B2
(45) Date of Patent: Feb. 25, 2003

(54) HIGHLY ACTIVE SUPPORTED CATALYST COMPOSITIONS

(75) Inventor: Anthony N. Speca, Kingwood, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 68 days.

(21) Appl. No.: 09/885,809

(22) Filed: Jun. 20, 2001

(65) Prior Publication Data

US 2001/0051698 A1 Dec. 13, 2001

Related U.S. Application Data

(63) Continuation of application No. 09/339,128, filed on Jun. 24, 1999, now Pat. No. 6,368,999.
(60) Provisional application No. 60/098,007, filed on Aug. 26, 1998.

(51) Int. Cl.[7] .............................. C08F 4/16; B01J 31/38
(52) U.S. Cl. ...................... 502/152; 502/104; 502/117; 502/239; 526/129; 526/133; 526/134; 526/160; 526/943
(58) Field of Search .................... 526/129, 133, 526/134, 160, 943; 502/104, 117, 119, 125, 128, 152, 233, 239

(56) References Cited

U.S. PATENT DOCUMENTS

| 3,340,319 | A | 9/1967 | Banks |
| 4,130,505 | A | 12/1978 | Nasser, Jr. et al. |
| 4,359,403 | A | 11/1982 | Hoff et al. |
| 5,064,796 | A | 11/1991 | Speca |
| 5,108,975 | A | 4/1992 | Schubert et al. |
| 5,284,926 | A | 2/1994 | Benham et al. |
| 5,364,915 | A | 11/1994 | Benham et al. |
| 5,527,867 | A | 6/1996 | Bergmeister |
| 5,643,847 | A | 7/1997 | Walzer, Jr. |
| 5,885,924 | A | 3/1999 | Ward |
| 6,177,526 | B1 * | 1/2001 | Fritze .................... 526/128 |
| 6,239,059 | B1 | 5/2001 | Saudemont et al. ........ 502/120 |

FOREIGN PATENT DOCUMENTS

| CA | 2206971 | 5/1997 |
| EP | 0 090 374 | 10/1983 |
| EP | 0 166 157 | 1/1986 |
| EP | 0 594 914 A1 | 5/1994 |
| EP | 0 628 574 A1 * | 12/1994 |
| EP | 0 676 418 A1 | 10/1995 |
| EP | 0 727 443 A1 | 8/1996 |
| EP | 0 757 992 A1 | 2/1997 |
| EP | 0 775 707 A1 | 5/1997 |
| EP | 0 811 960 A1 | 12/1997 |
| EP | 0 906 920 A1 | 7/1999 |
| WO | WO 91/06577 | 5/1991 |
| WO | WO 96/04319 | 2/1996 |
| WO | WO 96/23005 | 8/1996 |
| WO | WO 96/40796 | 12/1996 |

OTHER PUBLICATIONS

"Intercalation of catalytically active metal complexes in phyllosilicates and their application as propene polymerisation catalysts" Tudor, et al, Chem. Commun., pp. 2031–2032, (1996).

\* cited by examiner

Primary Examiner—David W. Wu
Assistant Examiner—R. Harlan
(74) Attorney, Agent, or Firm—Paige Schmidt; Kevin M. Faulkner

(57) ABSTRACT

This invention relates to metallocene catalyst compositions which are highly active for the polymerization of olefins, particularly prochiral α-olefins. The catalyst compositions contain at least one metallocene, and least one activator and a support that has been fluorided using a fluoride containing compound.

17 Claims, No Drawings

HIGHLY ACTIVE SUPPORTED CATALYST COMPOSITIONS

CROSS-REFERENCE TO RELATED APPLICATION

This is present application is a Continuation application of, and claims priority to, U.S. Ser. No. 09/339,128, filed on Jun. 24, 1999, U.S. Pat No. 6,368,999 which claims priority to Provisional Application U.S. Ser. No. 60/098,007 filed on Aug. 26, 1998.

FIELD OF INVENTION

This invention relates generally to supported catalysts, and more particularly to supported metallocene catalysts and methods for their production and use.

BACKGROUND

Metallocene catalyst systems and their use for olefin polymerization are well known. Metallocene catalysts are single-sited and differently activated compared to conventional Ziegler-Natta catalysts. A typical metallocene catalyst system includes a metallocene catalyst, a support, and an activator. Upon attaching or "fixing" the catalyst to the support, the catalyst is generally referred to as a supported catalyst. For many polymerization processes, supported catalysts are required, and various methods for attaching metallocene catalysts to a support are known in the art. Supports suitable for use with metallocene catalyst are generally porous materials and can include organic materials, inorganic materials and inorganic oxides.

However, many supports contain reactive functionalities. In some instances, these reactive functionalities may deactivate or reduce the activity of the catalyst fixed to the support. When this occurs, the addition of more catalyst to the catalyst system may be necessary to ensure sufficient polymer production during olefin polymerization. Increasing the catalyst concentration in the catalyst system to compensate for activity reduction caused by reactive functionalities is generally undesirable for many reasons. For instance, generally the addition of more catalyst may also require the addition of more activator. As such, increasing the concentrations of both catalyst and activator to overcome the effects of catalyst deactivation by reactive functionalities substantially increases the cost of olefin polymerization.

Hydroxyl groups are an example of a reactive functionality present on some supports which deactivate metallocene catalysts. Hydroxyl groups are present on supports, such as inorganic oxides. An example of an inorganic oxide is silica gel. As such, when using silica gel to support a metallocene catalyst, it is desirable to remove, reduce or render inactive a sufficient number of the hydroxyl groups. Methods of removing or reducing hydroxyl groups include thermal and/or chemical treatments. The removal of hydroxyl groups is known as dehydroxylation.

Thermally treating or heating the support material generally avoids contamination of the support by undesirable chemicals. However, in the case of many porous supports, such as silica gel, heating the support may fail to achieve sufficient dehydroxylation. Chemically treating the support material can be expensive and may result in contamination of the support.

Thus, there remains a need for increasing the activity of supported metallocene catalyst systems. Particularly, there remains a need for improved supported metallocene catalysts wherein the reactive functionalities of the support are reduced and/or deactivated.

SUMMARY OF THE INVENTION

The present invention provides a highly active metallocene supported catalyst composition. Generally, the inventor has discovered that when at least one metallocene catalyst is bound to a fluorided support, the activity of this metallocene supported catalyst composition is higher compared to the activity of the same metallocene catalyst bound to a non-fluorided support. These non-fluorided supports included supports to which no fluorine was added or a halide other than fluorine was added.

In one embodiment, the metallocene supported catalyst composition includes a metallocene catalyst and a support composition. The support composition may be represented by the formula: Sup F, wherein Sup is a support, and F is a fluorine atom bound to the support. The support composition may be a fluorided support composition.

In another embodiment, the metallocene supported catalyst composition includes a support composition represented by the formula: Sup L $F_n$. "Sup" may further be defined as a support selected from the group which includes talc, clay, silica, alumina, magnesia, zirconia, iron oxides, boria, calcium oxide, zinc oxide, barium oxide, thoria, aluminum phosphate gel, polyvinylchloride and substituted polystyrene and mixtures thereof.

"L" is a first member selected from the group which includes (i) bonding, sufficient to bound the F to the Sup; (ii) B, Ta, Nb, Ge, Ga, Sn, Si, P, Ti, Mo, Re, or Zr bound to the Sup and to the F; and (iii) O bound to the Sup and bound to a second member selected from the group consisting of B, Ta, Nb, Ge, Ga, Sn, Si, P, Ti, Mo, Re, or Zr which is bound to the F;

"F" is a fluorine atom; and

"n" is a number from 1–7.

The support composition desirably may be a fluorided support composition. The metallocene supported catalyst composition may also include boron and may also include an activator, such as alkylalumoxane or MAO or haloaryl boron or aluminum compounds.

The metallocene catalyst may be represented by the formula: $Cp_m MR_n X_q$, wherein Cp is a cyclopentadienyl ring which may be substituted, or derivative thereof which may be substituted, M is a Group 4, 5, or 6 transition metal, R is a hydrocarbyl group or hydrocarboxy group having from one to 20 carbon atoms, X may be a halide, a hydride, an alkyl group, an alkenyl group or an arylalkyl group, and m=1–3, n=0–3, q=0–3, and the sum of m+n+q is equal to the oxidation state of the transition metal.

The present invention also provides a method of making the metallocene supported catalyst composition. The method step includes contacting the metallocene catalyst with a support composition, desirably a fluorided support composition, under suitable conditions and for a sufficient time, wherein the support composition is represented by the formula Sup L $F_n$. The support composition, and particularly the fluorided support composition, may be made by contacting a hydroxyl group containing support material with at least one inorganic fluoride under suitable conditions and for a sufficient time wherein the fluoride becomes bound to the support.

The present invention also provides an olefin polymerization method. The steps of the olefin polymerization method include contacting a polymerizable olefin with the metallocene supported catalyst composition under suitable conditions and for a sufficient time. Desirably, the polymerizable material is propylene. The polymerizable olefin may be formed into numerous articles, such as, for example, films, fibers, fabrics, and molded structures.

DETAIL DESCRIPTION OF THE INVENTION

This invention is directed to metallocene catalyst compositions comprising the reaction product of at least three components: (1) one or more metallocenes; (2) one or more activators; and (3) one or more fluorided support compositions.

As used herein, the phrase "fluorided support composition" means a support, desirably particulate and porous, which has been treated with at least one inorganic fluorine containing compound. For example, the fluorided support composition can be a silicon dioxide support wherein a portion of the silica hydroxyl groups has been replaced with fluorine or fluorine containing compounds.

As used herein, the term "support composition" means a support, desirably particulate and porous, which has been treated with at least one fluorine containing compound. Suitable fluorine containing compounds include, but are not limited to, inorganic fluorine containing compounds and/or organic fluorine containing compounds.

In the specification, including the examples certain abbreviations may be used to facilitate the description. These may include: Me=methyl, Et=ethyl, Bu=butyl, Ph=phenyl, Cp=cyclopentadienyl, Cp*=pentamethyl cyclopentadienyl, Ind=indenyl, Ti=titanium, Hf=hafnium, Zr=zirconium, O=oxygen, Si=silicon B=boron, Ta=tantalum, Nb=niobium, Ge=germanium, Mg=magnesium, Al=aluminum, Fe=iron, Th=thorium, Ga=gallium, P=phosphorus, Mo=molybdenum, Re=rhenium, and Sn=tin.

Supports

Supports suitable for use in this invention are generally porous materials and can include organic materials, inorganic materials and inorganic oxides. Desirably, supports suitable for use in this invention include talc, clay, silica, alumina, magnesia, zirconia, iron oxides, boria, calcium oxide, zinc oxide, barium oxide, thoria, aluminum phosphate gel, polyvinylchloride and substituted polystyrene and mixtures thereof.

Particulate silicon dioxide materials are well known and are commercially available from a number of commercial suppliers. Desirably the silicon dioxide used herein is porous and has a surface area in the range of from about 10 to about 700 m$^2$/g, a total pore volume in the range of from about 0.1 to about 4.0 cc/g and an average particle diameter in the range of from about 10 to about 500 μm. More desirably, the surface area is in the range of from about 50 to about 500 m$^2$/g, the pore volume is in the range of from about 0.5 to about 3.5 cc/g and the average particle diameter is in the range of from about 15 to about 150 μm. Most desirably the surface area is in the range of from about 100 to about 400 m$^2$/g, the pore volume is in the range of from about 0.8 to about 3.0 cc/g and the average particle diameter is in the range of from about 20 to about 100 μm. The average pore diameter of typical porous silicon dioxide support materials is in the range of from about 10 to about 1000 Å. Desirably, the support material has an average pore diameter of from about 50 to about 500 Å, and most desirably from about 75 to about 350 Å.

Fluorine Compounds

The fluorine compounds suitable for providing fluorine for the support are desirably inorganic fluorine containing compounds. Such inorganic fluorine containing compounds may be any compound containing a fluorine atom as long as it does not contain a carbon atom. Particularly desirable are inorganic fluorine containing compounds selected from the group consisting of NH$_4$BF$_4$, (NH$_4$)$_2$SiF$_6$, NH$_4$PF$_6$, NH$_4$F, (NH$_4$)$_2$TaF$_7$, NH$_4$NbF$_4$, (NH$_4$)$_2$GeF$_6$, (NH$_4$)$_2$SmF$_6$, (NH$_4$)$_2$TiF$_6$, (NH$_4$)$_2$ZrF$_6$, MoF$_6$, ReF$_6$, GaF$_3$, SO$_2$ClF, F$_2$, SiF$_4$, SF$_6$, ClF$_3$, ClF$_5$, BrF$_5$, IF$_7$, NF$_3$, HF, BF$_3$, NHF$_2$ and NH$_4$HF$_2$. Of these, ammonium hexafluorosilicate and ammonium tetrafluoroborate are more desirable.

Ammonium hexafluorosilicate and ammonium tetrafluoroborate fluorine compounds are typically solid particulates as are the silicon dioxide supports. A desirable method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to the vessel for dehydration or calcining the support. Accordingly, the fluorine concentration present on the support is in the range of from 0.6 to 3.5 wt % of support.

Another method of treating the support with the fluorine compound is to dissolve the fluorine in a solvent, such as water, and then contact the support with the fluorine containing solution. When water is used and silica is the support, it is desirable to use a quantity of water which is less than the total pore volume of the support.

Dehydration or calcining of the silica is not necessary prior to reaction with the fluorine compound. Desirably the reaction between the silica and fluorine compound is carried out at a temperature of from about 100° C. to about 1000° C., and more desirably from about 200° C. to about 600° C. for about two to eight hours.

In one embodiment, the resulting support composition may be generically represented by the formula:

"Sup" is a support, "F" is a fluorine atom bound to the support. The fluorine atom may be bound, directly or indirectly, chemically or physically to the support. An example of chemical or physical bonding would be covalent and ionic bonding, respectively. The support composition desirably may be a fluorided support composition.

In another embodiment, the resulting support composition, such as a fluorided support composition, may be generically represented by the formula:

"Sup" is a support selected from the group which includes talc, clay, silica, alumina, magnesia, zirconia, iron oxides, boria, calcium oxide, zinc oxide, barium oxide, thoria, aluminum phosphate gel, polyvinylchloride and substituted polystyrene.

"L" is a first member selected from the group which includes (i) bonding, sufficient to bound the F to the Sup; (ii) B, Ta, Nb, Ge, Ga, Sn, Si, P, Ti, Mo, Re, or Zr bound to the Sup and to the F; and (iii) O bound to the Sup and bound to a second member selected from the group consisting of B, Ta, Nb, Ge, Ga, Sn, Si, P, Ti, Mo, Re, or Zr which is bound to the F;

"F" is a fluorine atom; and

"n" is a number from 1–7.

An example of such bonding sufficient to bound the F to the Sup would be chemical or physical bonding, such as, for example, covalent and ionic bonding. The support composition desirably may be a fluorided support composition.

Metallocenes

As used herein the term "metallocene" means one or more compounds represented by the formula $Cp_mMR_nX_q$ wherein Cp is a cyclopentadienyl ring which may be substituted, or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X may be a halide, a hydride, an alkyl group, an alkenyl group or an arylalkyl group, and m=1–3, n=0–3, q=0–3, and the sum of m+n+q is equal to the oxidation state of the transition metal.

Methods for making and using metallocenes are very well known in the art. For example, metallocenes are detailed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,132,381; 5,155,180, 5,198,401, 5,278,119; 5,304,614; 5,324,800; 5,350,723; 5,391,790; 5,436,305 and 5,510,502 each fully incorporated herein by reference.

Desirably, the metallocenes are one or more of those consistent with the formula:

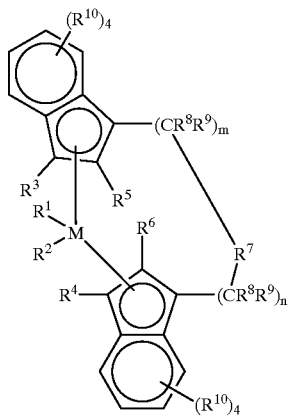

wherein M is a metal of Group 4, 5, or 6 of the Periodic Table desirably, zirconium, hafnium and titanium, most desirably zirconium;

$R^1$ and $R^2$ are identical or different, desirably identical, and are one of a hydrogen atom, a $C_1$–$C_{10}$ alkyl group, desirably a $C_1$–$C_3$ alkyl group, a $C_1$–$C_{10}$ alkoxy group, desirably a $C_1$–$C_3$ alkoxy group, a $C_6$–$C_{10}$ aryl group, desirably a $C_6$–$C_8$ aryl group, a $C_6$–$C_{10}$ aryloxy group, desirably a $C_6$–$C_9$ aryloxy group, a $C_2$–$C_{10}$ alkenyl group, desirably a $C_2$–$C_4$ alkenyl group, a $C_7$–$C_{40}$ arylalkyl group, desirably a $C_7$–$C_{10}$ arylalkyl group, a $C_7$–$C_{40}$ alkylaryl group, desirably a $C_7$–$C_{12}$ alkylaryl group, a $C_8$–$C_{40}$ arylalkenyl group, desirably a $C_8$–$C_{12}$ arylalkenyl group, or a halogen atom, desirably chlorine;

$R^5$ and $R^6$ are identical or different, desirably identical, are one of a halogen atom, desirably a fluorine, chlorine or bromine atom, a $C_1$–$C_{10}$ alkyl group, desirably a $C_1$–$C_4$ alkyl group, which may be halogenated, a $C_6$–$C_{10}$ aryl group, which may be halogenated, desirably a $C_6$–$C_8$ aryl group, a $C_2$–$C_{10}$ alkenyl group, desirably a $C_2$–$C_4$ alkenyl group, a $C_7$–$C_{40}$-arylalkyl group, desirably a $C_7$–$C_{10}$ arylalkyl group, a $C_7$–$C_{40}$ alkylaryl group, desirably a $C_7$–$C_{12}$ alkylaryl group, a $C_8$–$C_{40}$ arylalkenyl group, desirably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, desirably a chlorine atom, a $C_1$–$C_{10}$ alkyl group, desirably a $C_1$–$C_3$ alkyl group, or a $C_6$–$C_{10}$ aryl group, desirably a $C_6$–$C_9$ aryl group;

$R^7$ is

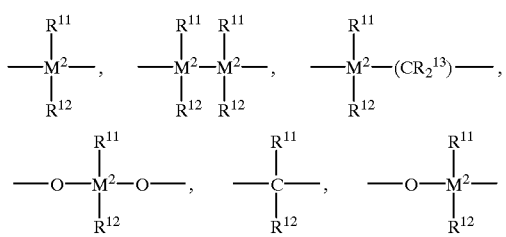

—$B(R^{11})$—, —$Al(R^{11})$—, —Ge—, —Sn—, —O—, —S—, —$SO_2$—, —$SO_2$—, —$N(R^{11})$—, —CO—, —$P(R^{11})$—, or —$P(O)(R^{11})$—;

wherein:

$R^{11}$, $R^{12}$ and $R^{13}$ are identical or different and are a hydrogen atom, a halogen atom, a $C_1$–$C_{20}$ alkyl group, desirably a $C_1$–$C_{10}$ alkyl group, a $C_1$–$C_{20}$ fluoroalkyl group, desirably a $C_1$–$C_{10}$ fluoroalkyl group, a $C_6$–$C_{30}$ aryl group, desirably a $C_6$–$C_{20}$ aryl group, a $C_6$–$C_{30}$ fluoroaryl group, desirably a $C_6$–$C_{20}$ fluoroaryl group, a $C_1$–$C_{20}$ alkoxy group, desirably a $C_1$–$C_{10}$ alkoxy group, a $C_2$–$C_{20}$ alkenyl group, desirably a $C_2$–$C_{10}$ alkenyl group, a $C_7$–$C_{40}$ arylalkyl group, desirably a $C_7$–$C_{20}$ arylalkyl group, a $C_8$–$C_{40}$ arylalkenyl group, desirably a $C_8$–$C_{22}$ arylalkenyl group, a $C_7$–$C_{40}$ alkylaryl group, desirably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, desirably silicon or germanium, most desirably silicon;

$R^8$ and $R^9$ are identical or different and have the meanings stated for $R^{11}$;

m and n are identical or different and are zero, 1 or 2, desirably zero or 1, m plus n being zero, 1 or 2, desirably zero or 1; and the radicals $R^3$, $R^4$, and $R^{10}$ are identical or different and have the meanings stated for $R^{11}$, $R^{12}$ and $R^{13}$. Two adjacent $R^{10}$ radicals can be joined together to form a ring system, desirably a ring system containing from about 4–6 carbon atoms.

Alkyl refers to straight or branched chain substituents. Halogen (halogenated) refers to fluorine, chlorine, bromine or iodine atoms, desirably fluorine or chlorine.

Particularly desirable transition metal compounds are compounds of the structures (A) and (B):

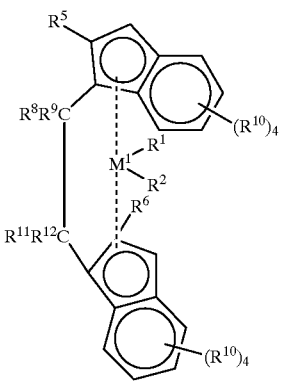

(A)

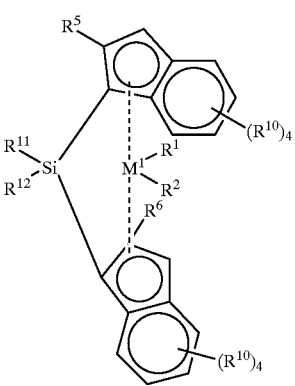

(B)

wherein:

M$^1$ is Zr or Hf, R$^1$ and R$^2$ are methyl or chlorine, and R$^5$, R$^6$ R$^8$, R$^9$, R$^{10}$, R$^{11}$ and R$^{12}$ have the above-mentioned meanings.

Illustrative but non-limiting examples of desirable transition metal compounds include:

Dimethylsilandiylbis (2-methyl-4-phenyl-1-indenyl) Zirconium dimethyl
Dimethylsilandiylbis(2-methyl-4,5-benzoindenyl) Zirconium dimethyl;
Dimethylsilandiylbis(2-methyl-4,6-diisopropylindenyl) Zirconium dimethyl;
Dimethylsilandiylbis(2-ethyl-4-phenyl-1-indenyl) Zirconium dimethyl;
Dimethyl silandiylbis (2-ethyl4-naphthyl-1-indenyl) Zirconium dimethyl,
Phenyl(methyl)silandiylbis(2-methyl-4-phenyl-1-indenyl) Zirconium dimethyl,
Dimethylsilandiylbis(2-methyl-4-(1-naphthyl)-1-indenyl) Zirconium dimethyl,
Dimethylsilandiylbis(2-methyl-4-(2-naphthyl)-1-indenyl) Zirconium dimethyl,
Dimethylsilandiylbis(2-methyl-indenyl)Zirconium dimethyl,
Dimethylsilandiylbis(2-methyl-4,5-diisopropyl-1-indenyl) Zirconium dimethyl,
Dimethylsilandiylbis(2,4,6-trimethyl-1-indenyl)Zirconium dimethyl,
Phenyl(methyl)silandiylbis(2-methyl-4,6-diisopropyl-1-indenyl)Zirconium dimethyl,
1,2-Ethandiylbis(2-methyl-4,6-diisopropyl-1-indenyl) Zirconium dimethyl,
1,2-Butandiylbis(2-methyl-4,6-diisopropyl-1-indenyl) Zirconium dimethyl,
Dimethylsilandiylbis(2-methyl-4-ethyl-1-indenyl) Zirconium dimethyl,
Dimethylsilandiylb is(2-methyl-4-isopropyl-1-indenyl) Zirconium dimethyl,
Dimethylsilandiylbis(2-methyl-4-t-butyl-1-indenyl) Zirconium dimethyl,
Phenyl(methyl)silandiylbis(2-methyl-4-isopropyl-1-indenyl)Zirconium dimethyl,
Dimethylsilandiylbis(2-ethyl-4-methyl-1-indenyl) Zirconium dimethyl,
Dimethylsilandiylbis(2,4-dimethyl-1-indenyl)Zirconium dimethyl)
Dimethylsilandiylbis(2-methyl-4-ethyl-1-indenyl) Zirconium dimethyl,
Dimethylsilandiylbis(2-methyl-α-acenaphth-1-indenyl) Zirconium dimethyl,
Phenyl(methyl)silandiylbis(2-methyl-4,5-benzo-1-indenyl) Zirconium dimethyl,
Phenyl(methyl)silandiylbis(2-methyl -4,5-(methylbenzo)-1-indenyl)Zirconium dimethyl,
Phenyl(methyl)silandiylbis(2-methyl-4,5-(tetramethylbenzo)-1-indenyl)Zirconium dimethyl,
Phenyl(methyl)silandiylbis(2-methyl-a-acenaphth-1-indenyl)Zirconium dimethyl,
1,2-Ethandiylbis(2-methyl-4,5-benzo-1-indenyl)Zirconium dimethyl,
1,2-Butandiylbis(2-methyl-4,5-benzo-1-indenyl)Zirconium dimethyl,
Dimethylsilandiylbis(2-methyl-4,5-benzo-1-indenyl) Zirconium dimethyl,
1,2-Ethandiylbis(2,4,7-trimethyl-1-indenyl)Zirconium dimethyl,
Dimethylsilandiylbis(2-methyl-1-indenyl)Zirconium dimethyl,
1,2-Ethandiylbis(2-methyl-1-indenyl)Zirconium dimethyl,
Phenyl(methyl)silandiylbis(2-methyl-1-indenyl)Zirconium dimethyl,
Diphenylsilandiylbis(2-methyl-1-indenyl)Zirconium dimethyl,
1,2-Butandiylbis(2-methyl-1-indenyl)Zirconium dimethyl,
Dimethylsilandiylbis(2-ethyl-1-indenyl)Zirconium dimethyl,
Dimethylsilandiylbis(2-methyl-5-isobutyl-1-indenyl) Zirconium dimethyl,
Phenyl(methyl)silandiylbis(2-methyl-5-isobutyl-1-indenyl) Zirconium dimethyl,
Dimethylsilandiylbis(2-methyl-5-t-butyl-1-indenyl) Zirconium dimethyl,
Dimethylsilandiylbis(2,5,6-trimethyl-1-indenyl)Zirconium dimethyl,
Dimethylsilandiylbis (2-methyl-4-phenyl-1-indenyl) Zirconium dichloride
Dimethylsilandiylbis(2-methyl-4,5-benzoindenyl) Zirconium dichloride,
Dimethylsilandiylbis(2-methyl-4,6-diisopropylindenyl) Zirconium dichloride,
Dimethylsilandiylbis(2-ethyl-4-phenyl-1-indenyl) Zirconium dichloride,
Dimethylsilandiylbis (2-ethyl-4-naphthyl-1-indenyl) Zirconium dichloride, Phenyl(methyl)silandiylbis(2-methyl -4-phenyl-1-indenyl)Zirconium dichloride,
Dimethylsilandiylbis(2-methyl4-(1-naphthyl)-1-indenyl) Zirconium dichloride,
Dimethylsilandiylbis(2-methyl-4-(2-naphthyl)-1-indenyl) Zirconium dichloride,
Dimethylsilandiylbis(2-methyl-indenyl)Zirconium dichloride, Dimethylsilandiylbis(2-methyl-4,5-diisopropyl-1-indenyl) Zirconium dichloride,
Dimethylsilandiylbis(2,4,6-trimethyl-1-indenyl)Zirconium dichloride,
Phenyl(methyl)silandiylbis(2-methyl-4,6-diisopropyl-1-indenyl)Zirconium dichloride,
1,2-Ethandiylbis(2-methyl-4,6-diisopropyl-1-indenyl) Zirconium dichloride,
1,2-Butandiylbis(2-methyl-4,6-diisopropyl-1-indenyl) Zirconium dichloride,
Dimethylsilandiylbis(2-methyl-4-ethyl-1-indenyl) Zirconium dichloride,
Dimethylsilandiylbis(2-methyl-4-isopropyl-1-indenyl) Zirconium dichloride,
Dimethylsilandiylbis(2-methyl-4-butyl-1-indenyl) Zirconium dichloride,
Phenyl(methyl)silandiylbis(2-methyl-4-isopropyl-1-indenyl)Zirconium dichloride,
Dimethylsilandiylbis(2-ethyl-4-methyl-1-indenyl) Zirconium dichloride,
Dimethylsilandiylbis(2,4-dimethyl-1-indenyl)Zirconium dichloride,
Dimethylsilandiylbis(2-methyl-4-ethyl-1-indenyl) Zirconium dichloride,
Dimethylsilandiylbis(2-methyl-α-acenaphth-1-indenyl) Zirconium dichloride,
Phenyl(methyl)silandiylbis(2-methyl-4,5-benzo-1-indenyl) Zirconium dichloride,
Phenyl(methyl)silandiylbis(2-methyl-4,5-(methylbenzo)-1-indenyl)Zirconium dichloride,
Phenyl(methyl)silandiylbis(2-methyl-4,5-(tetramethylbenzo-1-indenyl)Zirconium dichloride,
Phenyl(methyl)silandiylbis (2-methyl-a-acenaphth-1-indenyl)Zirconium dichloride,
1,2-Ethandiylbis(2-methyl-4,5-benzo-1-indenyl)Zirconium dichloride,
1,2-Butandiylbis(2-methyl-4,5-benzo-1-indenyl)Zirconium dichloride,
Dimethylsilandiylbis(2-methyl-4,5-benzo-1-indenyl) Zirconium dichloride,
1,2-Ethandiylbis(2,4,7-trimethyl-1-indenyl)Zirconium dichloride,
Dimethylsilandiylbis(2-methyl-1-indenyl)Zirconium dichloride,
1,2-Ethandiylbis(2-methyl-1-indenyl)Zirconium dichloride,
Phenyl(methyl)silandiylbis(2-methyl-1-indenyl)Zirconium dichloride,
Diphenylsilandiylbis(2-methyl-1-indenyl)Zirconium dichloride,
1,2-Butandiylbis(2-methyl--1-indenyl)Zirconium dichloride,
Dimethylsilandiylbis(2-ethyl-1-indenyl)Zirconium dichloride,
Dimethylsilandiylbis(2-methyl-5-isobutyl-1-indenyl) Zirconium dichloride,
Phenyl(methyl)silandiylbis(2-methyl-5-isobutyl-1-indenyl) Zirconium dichoride,
Dimethylsilandiylbis(2-methyl-5-t-butyl-1indenyl) Zirconium dichloride,
Dimethylsilandiylbis(2,5,6-trimethyl-1-indenyl)Zirconium dichloride, and the like.

Many of these desirable transition metal compound components are described in detail in U.S. Pat. Nos. 5,145,819; 5,243,001; 5,239,022; 5,329,033; 5,296,434; 5,276,208; 5,672,668, 5,304,614 and 5,374,752; and EP 549 900 and 576 970 all of which are herein fully incorporated by reference.

Additionally, metallocenes such as those described in U.S. Pat. No. 5,510,502, U.S. Pat. No. 4,931,417, U.S. Pat. No. 5,532,396, U.S. Pat. No. 5,543,373, WO 98/014585, EP611 773 and WO 98/22486 (each fully incorporated herein by reference) are suitable for use in this invention.

Activators

Metallocenes are generally used in combination with some form of activator in order to create an active catalyst system. The term "activator" is defined herein to be any compound or component, or combination of compounds or components, capable of enhancing the ability of one or more metallocenes to polymerize olefins to polyolefins. Alklyalumoxanes such as methylalumoxane (MAO) are commonly used as metallocene activators. Generally alkylalumoxanes contain about 5 to 40 of the repeating units:

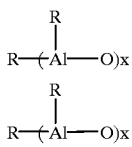

where R is a $C_1$-$C_8$ alkyl including mixed alkyls. Particularly desirable are the compounds in which R is methyl. Alumoxane solutions, particularly methylalumoxane solutions, may be obtained from commercial vendors as solutions having various concentrations. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968, 827, 5,308,815, 5,329,032, 5,248,801, 5,235,081, 5,103,031 and EP-A-0 561 476, EP-B1-0 279 586, EP-A-0 594-218 and WO 94/10180, each fully incorporated herein by reference. (as used herein unless otherwise stated "solution" refers to any mixture including suspensions.)

Ionizing activators may also be used to activate metallocenes. These activators are neutral or ionic, or are compounds such as tri(n-butyl)ammonium tetrakis (pentaflurophenyl)borate, which ionize the neutral metallocene compound. Such ionizing compounds may contain an active proton, or some other cation associated with, but not coordinated or only loosely coordinated to, the remaining ion of the ionizing compound. Combinations of activators may also be used, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a desirable method of preparation wherein metallocenes (bisCp and monoCp) are protonated by an anion precursor such that an alkyl/hydride group is abstracted from a transition metal to make it both cationic and charge-balanced by the non-coordinating anion. Suitable ionic salts include tetrakis-substituted borate or aluminum salts having fluorided aryl-constituents such as phenyl, biphenyl and napthyl.

The term "noncoordinating anion" (NCA) means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing both the active metallocene cation and a noncoordinating anion is also known. See, for example, EP-A-0 426 637 and EP-A-0 573 403 (incorporated herein by reference). An additional method of making the ionic catalysts uses ionizing anion precursors which are initially neutral Lewis acids but form the cation and anion upon ionizing reaction with the metallocene compounds, for example the use of tris (pentafluorophenyl) borane. See EP-A-0 520 732 (incorporated herein by reference). Ionic catalysts for addition polymerization can also be prepared by oxidation of the metal centers of transition metal compounds by anion precursors containing metallic oxidizing groups along with the anion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Desirable methods for supporting ionic catalysts comprising metallocene cations and NCA are described in U.S. Pat. No. 5,643,847, U.S. patent application Ser. No. 09184358, filed Nov. 2, 1998 U.S. Pat No. 6,228,795 and U.S. patent application Ser. No. 09,184,389, filed Nov. 2, 1998 U.S. Pat No. 6,143,686 (all fully incorporated herein by reference). When using the support composition, and particularly the fluorided support composition, of this invention, these NCA support methods generally comprise using neutral anion precursors that are sufficiently strong Lewis acids to react with the hydroxyl reactive functionalities present on the silica surface such that the Lewis acid becomes covalently bound.

In one embodiment of this invention, the activator is one or more NCAs and the supportation method described above is used. This reaction can be generically represented by the chemical formula:

$$[L_n L'_m M'R']^+[LA—O—SupLF_n]^-, \quad (1)$$

where $[L_n L'_m M'R']^+$ is the catalytically active transition metal cation and LA—O— is the activator anion bound to the support composition, particularly the fluorided support composition, $SupLF_n$. More specifically, $L_n$ is one or more ligands (n equals $d^0-1$ where $d^0$ is the highest oxidation state of M') covalently bound to M', $L'_m$ is a neutral, non-oxidizing ligand having a dative bond to M' (typically m equals 0 to 3), M' is a Group 4, 5, 6, 9, or 10 transition metal, R' is a ligand having a σ bond to M' into which a polymerizable monomer or macromonomer can insert for coordination polymerization. LA is a Lewis acid that is capable of forming the anionic activator and O is oxygen.

The activator anion neutral precursors that serve as the Lewis acid (LA) include any of the noncoordinating anion precursors of sufficient acidity to accept the available electron pair of the hydroxyl group oxygen atom and facilitate the protonation of the transition metal compound or a secondary proton acceptor (see below) by the silanol group proton. The desirable activator anion neutral precursors that serve as the Lewis acid (LA) are strong Lewis acids with non-hydrolyzable ligands, at least one of which is electron-withdrawing, such as those Lewis acids known to abstract an anionic fragment from dimethyl zirconocene (biscyclopentadienyl zirconium dimethyl) e.g., tris-perfluorophenyl borane, trisperfluoronaphthyl borane, trisperfluorobiphenyl borane. These precursors therefore should not possess any reactive ligands, which can be protonated by any remaining hydroxyl groups on the support composition, particularly the fluorided support composition. For example, any Group 13 element based Lewis acids having only alkyl, halo, alkoxy, and/or amido ligands, which are readily hydrolyzed in aqueous media, may not be suitable. At least one ligand of LA must be sufficiently electron-withdrawing to achieve the needed acidity, for example, tris-perfluorophenyl borane, under typical reaction conditions. Typical metal/metalloid centers for LA will include boron, aluminum, antimony, arsenic, phosphorous and gallium. Most desirably LA is a neutral compound comprising a Group 13 metalloid center with a complement of ligands together sufficiently electron-withdrawing such that the Lewis acidity is greater than or equal to that of $AlCl_3$. Examples include tris-perfluorophenylborane, tris(3,5-di (trifluoromethyl)phenyl)borane, tris(di-t-butylmethylsilyl) perfluorophenylborane, and other highly fluorinated tris-arylborane compounds.

Additionally, when the activator for the metallocene supported catalyst composition is a NCA, desirably the NCA is first added to the support composition followed by the addition of the metallocene catalyst. When the activator is MAO, desirably the MAO and metallocene catalyst are dissolved together in solution. The support is then contacted with the MAO/metallocene catalyst solution. Other methods and order of addition will be apparent to those skilled in the art.

Polymerization

The metallocene supported catalyst composition is useful in coordination polymerization of unsaturated monomers conventionally known to be polymerizable under coordination polymerization conditions. Such conditions also are well known and include solution polymerization, slurry polymerization, and low pressure gas phase polymerization. The metallocene supported catalysts compositions of the present invention are thus particularly useful in the known operating modes employing fixed-bed, moving-bed, fluid-bed, or slurry processes conducted in single, series or parallel reactors.

The metallocene supported catalyst composition of this invention are particularly suitable for propylene polymerizations. Any process may be used, but propylene polymerizations are most commonly conducted using a slurry processes in which the polymerization medium can be either a liquid monomer, like propylene, or a hydrocarbon solvent or diluent, advantageously aliphatic paraffin such as propane, isobutane, hexane, heptane, cyclohexane, etc. or an aromatic diluent such as toluene. The polymerization temperatures may be those considered low, e.g., less than 50° C., desirably 0° C.–30° C., or may be in a higher range, such as up to about 150° C., desirably from 50° C. up to about 80° C., or at any ranges between the end points indicated. Pressures can vary from about 100 to about 700 psia (0.69–4.8 MPa). Additional description is given in U.S. Pat. Nos. 5,274,056 and 4,182,810 and WO 94/21962 which are each fully incorporated by reference.

Propylene homopolymers may be formed with the metallocene supported catalyst composition using conventional polymerization techniques. The microstructure of the homopolymer will desirably possess a meso run length as measured by $^{13}$C NMR of 70% or greater relative to the total polymer produced. Copolymers with ethylene may be formed by introduction of ethylene to the propylene slurry or gas phase polymerization of gaseous propylene and ethylene comonomers. Copolymers with ethylene desirably contain 0.1 to 10 wt % comonomer. Stereoregular homopolymers and copolymers of α-olefins may be formed with this system by introduction of the appropriate monomer or monomers to a slurry or bulk propylene process.

Pre-polymerization may also be used for further control of polymer particle morphology in typical slurry or gas phase reaction processes in accordance with conventional teachings. For example such can be accomplished by pre-polymerizing a $C_2$–$C_6$ alpha-olefin for a limited time, for example, ethylene is contacted with the supported metallocene catalyst composition at a temperature of −15 to 30° C. and ethylene pressure of up to about 250 psig (1724 kPa) for 75 min. to obtain a polymeric coating on the support of polyethylene of 30,000–150,000 molecular weight. The pre-polymerized catalyst is then available for use in the polymerization processes referred to above. In a similar manner, the activated catalyst on a support coated with a previously polymerized thermoplastic polymer can be utilized in these polymerization processes.

Additionally it is desirable to reduce or eliminate polymerization poisons that may be introduced via feedstreams, solvents or diluents, by removing or neutralizing the poisons. For example, monomer feed streams or the reaction diluent may be pre-treated, or treated in situ during the polymerization reaction, with a suitable scavenging agent. Typically such will be an organometallic compound employed in processes such as those using the Group-13 organometallic compounds of U.S. Pat. No. 5,153,157 and WO-A-91/09882 and WO-A-94/03506, noted above, and that of WO-A-93/14132.

EXAMPLES

The following examples are presented to illustrate the foregoing discussion. All parts, proportions and percentages are by weight unless otherwise indicated. Although the examples may be directed to certain embodiments of the present invention, they are not to be viewed as limiting the invention in any specific respect.

Preparation of the Supports

The following example shows that silica can be fluorided during the silica gel heat dehydration process.

Example 1

48.5 grams of $SiO_2$, available from Grace Davison, a subsidiary of W.R. Grace Co.-Conn. as Sylopol®952 ("952 silica gel") having $N_2$ pore volume 1.63cc/g and a surface area of 312m$^2$/g, was dry mixed with 1.5 grams ammonium hexafluorosilicate available from Aldrich Chemical Company, Milwaukee Wis. The ammonium hexafluorosilicate added corresponds to 1.05 millimole F per gram silica gel. The mixture was transferred to a 5 cm ID by 50 cm vycor glass tube having a medium frit plug 3.8 cm from one end. The tube was inserted into a tube furnace and a flow of $N_2$ (220 cc/min) was passed up through the frit to fluidize the silica bed. The furnace was heated according to the following schedule.

Raise the temperature from 25 to 150° C. over 5 hours

Hold the temperature at 150° C. for 4 hours

Raise the temperature from 150 to 500° C. over 2 hours

Hold the temperature at 500° C. for 4 hours

Heat off and allow to cool under $N_2$

When cool the fluorided silica was stored under $N_2$. Neutron Activation Analysis, Nuclear Analytical Services, The University of Texas at Austin, showed 1.68±0.06 weight percent (wt %) fluorine.

The following examples show that the weight percent fluoride on the silica can be controlled by the amount and type of fluoride containing compound, such as an inorganic fluoride containing compound, added to the silica gel prior to the heat dehydration.

Examples 2 through 14

In a similar manner the 952 silica gel was treated as described in Example 1 except different weights and fluorine compounds were used. Details are shown in Table 1. Column three describes the wt % of fluorine compound present in the total silica/fluorine compound sample before heating. Column four labeled "added" describes the wt % of fluorine present in the sample before heating. Column five labeled "found" describes the wt % of fluorine present in the sample after heating. The wt % in column five is higher than column four reflecting, to some degree, the loss of water during heating.

TABLE 1

500° C. Fluorided Silica Examples

| Example | Fluorine Compound | wt % of Fluorine Compound | Fluorine (wt %) added | Found |
|---|---|---|---|---|
| 2 | $(NH_4)_2SiF_6$ | 0.5 | 0.32 | 0.77 ± 0.05 |
| 3 | " | 1 | 0.64 | 1.32 ± 0.05 |
| 4 | " | 2 | 1.28 | 1.68 ± 0.06 |
| 5 | " | 3 | 1.92 | 2.55 ± 0.09 |
| 6 | " | 4 | 2.56 | 3.04 ± 0.09 |
| 7 | " | 6 | 3.84 | 3.20 ± 0.10 |
| 8 | $NH_4BF_4$ | 1.8 | 1.28 | n.d.[1] |
| 9 | " | 3.6 | 2.56 | 1.89 ± 0.11 |
| 10 | " | " | " | 1.95 ± 0.06 |
| 11 | $(NH_4)_2PF_6$ | 1.8 | 1.28 | 1.66 ± 0.06 |
| 12 | " | 3.6 | 2.56 | 2.20 ± 0.09 |
| 13 | " | " | " | 2.26 ± 0.06 |
| 14 | $NH_4F$ | 2.5 | 1.28 | 1.68 ± 0.07 |

[1]Not determined

Examples 15–21 show that the silica gel can be fluorided during heat dehydration at different temperatures.

Example 15

In a similar manner to Example 1, 48.15 grams of the 952 silica gel was dry mixed with 1.85 grams ammonium fluoride from Aldrich Chemical Company, Milwaukee Wis. The ammonium fluoride added corresponds to 1.05 millimole F per gram silica gel. The following heat schedule was used.

Raise the temperature from 25 to 150° C. over 5 hours

Hold the temperature at 150° C. for 4 hours

Raise the temperature from 150 to 600° C. over 2 hours
Hold the temperature at 600° C. for 4 hours
Heat off and allow to cool under $N_2$
When cool the fluorided silica was stored under $N_2$. Neutron Activation Analysis showed 2.00±0.09 wt % fluorine.

Example 16

The 952 silica gel was treated as in Example 1 except the following heat schedule was used.
Raise the temperature from 25 to 150° C. over 5 hours
Hold the temperature at 150° C. for 4 hours
Raise the temperature from 150 to 300° C. over 2 hours
Hold the temperature at 300° C. for 4 hours
Heat off and allow to cool under $N_2$
When cool the fluorided silica was stored under $N_2$.

Examples 17 through 21

In a similar manner the 952 silica gel was fluorided as in Example 16 except that different weights and fluorine Compounds were used. Details are shown in Table 2. Similar to Table 1, column three describes the wt % of fluorine compound present in the total silica/fluorine compound sample before heating. Column four labeled "added" describes the wt % of fluorine present in the sample before heating. Column five labeled "found" describes the wt % of fluorine present in the sample after heating. The wt % in column five is higher than column four reflecting, to some degree, the loss of water during heating.

TABLE 2

| | 300° C. Fluorided Silica Examples | | | |
|---|---|---|---|---|
| | Fluorine | wt % of Fluorine | Fluorine (wt %) | |
| Example | Compound | Compound | added | Found |
| 17 | $(NH_4)_2SiF_6$ | 1 | 0.64 | 0.93 ± 0.05 |
| 18 | " | 2 | 1.28 | 1.55 ± 0.05 |
| 19 | " | 4 | 2.56 | 3.22 ± 0.09 |
| 20 | " | 6 | 3.84 | n.d.[1] |
| 21 | $NH_4BF_4$ | 1.8 | 1.28 | 1.81 ± 0.06 |

[1]not determined

Examples 22 and 23 show silica gels from other manufacturers can be fluorided during heat dehydration.

Example 22

48.5 grams of $SiO_2$, available from The PQ Corporation, Valley Forge Pa. as MS 1340 having a surface area of 450 $m^2$/g and pore volume of 1.3 cc/g, was dry mixed with 1.5 grams ammonium hexafluorosilicate available from Aldrich Chemical Co. The mixture was transferred to the fluidized dehydrator described in Example 1 and a flow of $N_2$ (400 cc/min) was passed through the unit. The furnace was heated according to the following schedule.
Raise the temperature from 25 to 150° C. over 5 hours
Hold the temperature at 150° C. for 4 hours
Raise the temperature from 150 to 500° C. over 2 hours
Hold the temperature at 500° C. for 4 hours
Heat off and allow to cool under $N_2$
When cool the fluorided silica was stored under $N_2$. Neutron Activation Analysis showed 1.93±0.045 percent fluorine.

Example 23

48.5 grams of $SiO_2$, available from Crosfield Limited, Warrington England as MD682CM having a surface area of 280 $m^2$/g and a pore volume of 1.4 cc/g, was dry mixed with 1.5 grams ammonium hexafluorosilicate available from Aldrich Chemical Co. The mixture was transferred to the fluidized dehydrator described in Example 1 and a flow of $N_2$ (200 cc/min) was passed through the unit. The furnace was heated according to the following schedule.
Raise the temperature from 25 to 150° C. over 5 hours
Hold the temperature at 150° C. for 4 hours
Raise the temperature from 150 to 500° C. over 2 hours
Hold the temperature at 500° C. for 4 hours
Heat off and allow to cool under $N_2$
When cool the fluorided silica was stored under $N_2$. Neutron Activation Analysis showed 1.96±0.052 percent fluorine.

Comparative Examples 1–10 describe the preparation of non-fluorided, dehydrated silicas for comparison as supports to the fluorided silicas.

Comparative Example 1

50.0 grams of $SiO_2$(952 silica gel), was transferred to a 5 cm ID by 50 cm vycor glass tube having a medium frit plug 3.8 cm from one end. The tube was inserted into a tube furnace and a flow of $N_2$ (220 cc/min) was passed through the frit to fluidize the silica bed. The furnace was heated according to the following schedule.
Raise the temperature from 25 to 150° C. over 5 hours
Hold the temperature at 150° C. for 4 hours
Raise the temperature from 150 to 800° C. over 2 hours
Hold the temperature at 800° C. for 4 hours
Heat off and allow to cool under $N_2$
When cool the dehydrated silica was stored under $N_2$.

Comparative Exainple 2

In a similar manner the 952 silica gel was dehydrated with the same schedule as Comparative Example 1 except the maximum temperature was 600° C. When cool the dehydrated silica was stored under $N_2$.

Comparative Example 3

In a similar manner the 952 silica gel was dehydrated with the same schedule as Comparative Example 1 except the maximum temperature was 500° C. When cool the dehydrated silica was stored under $N_2$.

Comparative Example 4

In a similar manner Sylopol®948 silica gel ("948 silica gel") having a pore volume of 1.7 cc/g and a surface area of 335 $m^2$/g, available from Grace Davison, a subsidiary of W. R. Grace Co.-Conn. was dehydrated with the same schedule as Comparative Example 3. When cool the dehydrated silica was stored under $N_2$.

Comparative Example 5

In a similar manner the 952 silica gel was dehydrated with the same schedule as Comparative Example 1 except the maximum temperature was 300° C. When cool the dehydrated silica was stored under $N_2$.

The Comparative Example 6 describes the preparation of a non-fluorided, chemically dehydrated silica for comparison as a support to fluorided silica.

Comparative Example 6

25.00 g of the silica prepared in Comparative Example 4 was loaded to a 1000 milliliter flask and 250 ml hexane added. To the slurry under stirring was added 5.3 milliliters hexamethyldisilazane, available from Aldrich Chemical Company, Milwaukee Wis. After the dropwise addition was complete the slurry was stirred for 30 minutes then refluxed for 120 minutes. When cool the flask was taken into the dry box. The supernatant was decanted then the slurry washed two times with hexane, two times with isopentane and dried under vacuum at ambient temperature. Obtained 25.76 grams of chemically dehydrated silica. The dehydrated silica was stored under $N_2$.

The Comparative Example 7 describes the preparation of silica fluorided with a fluoriding agent at room temperature for comparison as a support to fluorided silica of the present invention.

Comparative Example 7

15.0 grams of 952 silica gel, previously heat dehydrated with the heat schedule shown in Example 1, was loaded into a 250 milliliter flask and the flask evacuated. The vacuum was replaced by $N_2$ and the procedure repeated three times. In the dry box under $N_2$ a stir bar was added. In a separate flask 42.25 grams of dry and $N_2$ purged toluene was combined with 0.615 grams dimethylamine sulfur trifluoride, available from Aldrich Chemical Co. The toluene solution was slowly added to the silica then the slurry was heated to 50° C. for 150 minutes followed by more toluene (15.1 grams) and an additional 30 minutes heating. Stirring was stopped and the supernatant decanted. The residue was washed three times with 20–25 gram portions of toluene. The final residue was vacuum dried to a final temperature of 60° C. Dry weight of the treated silica was 15.35 grams. Neutron Activation Analysis showed 1.70±0.1 percent fluorine. The fluorided silica was stored under $N_2$ prior to use.

The Comparative Examples 8–10 show that silica gel can be halogenated with the congeners of fluorine during heat dehydration.

Comparative Examples 8 through 10

In a manner similar to Example 15, non-fluorided silica (952 silica gel) was mixed with other ammonium halide compounds in molar amounts equal to the millimoles fluorine used then the mixture was heated as described previously. When cool the dehydrated silicas were stored under $N_2$.

Details are shown in Table 3. Column three describes the wt % of halide compound present in the total silica/halide compound sample. Column four labeled "added" describes the wt % of halide present in the sample before heating. Column five labeled "found" describes the wt % of halide present in the sample after heating.

TABLE 3

| | Treated with Congener Halogens | | | |
|---|---|---|---|---|
| Comparative Example | Halide Compound | wt %[1] of Halide Compound | Elemental Halide (wt %) Added | Elemental Halide (wt %) Found |
| 8 | $NH_4Cl$ | 5.3 | 3.7 | 0.19 ± 0.004 |
| 9 | $NH_4Br$ | 9.3 | 8.4 | 0.38 ± 0.04 |
| 10 | $NH_4I$ | 13.4 | 13.5 | 0.36 ± 0.03 |

[1]equivalent to 1.05 millimoles per gram of silica

Catalysts

Examples 24–25 and Comparative Examples 11–12 show that metallocene catalysts prepared with methylalumoxane and dehydrated fluorided silica as the support have higher activity compared to the same catalysts prepared with methylaumoxane using dehydrated silica. Except as otherwise stated in the specific example, the polymerization procedure of Example 24 was followed.

Example 24.

In the dry box under $N_2$ 0.0525 grams of rac-dimethylsilandiylbis(2-methylindenyl) zirconium dichloride was placed in a 50 milliliter beaker and 4.55 grams of Methylalumoxane as a 30 % solution in toluene was added. The resulting metallocene solution was stirred for 30 minutes with a bar magnet. Then 15.0 grams of dried and $N_2$ purged toluene was added followed by another 5 minutes of stirring. Separately 5.00 grams of the fluorided silica prepared in Example 8 was transferred to a 150 milliliter beaker. The metallocene solution was added to the fluorided silica gel in three aliquots with stirring. The resulting slurry was stirred for an additional 60 minutes then the volatiles were removed under vacuum. Heat was applied to the drying catalyst until a final temperature of 50° C. was held for 60 minutes. The dried catalyst was 6.52 grams of a finely divided, free flowing solid. Elemental analysis showed 9.18% Al and 0.142% Zr.

Batch Polymerization

A 2 liter autoclave reactor previously hot flushed with $N_2$ and cooled to ambient temperature was charged with triethylaluminum (1 milliliter of a 1M solution in hexane) followed by 1100 milliliters of propylene. If needed for the polymerization about 5 millimole hydrogen was added from a reservoir by pressure difference prior to the propylene. After heating the reactor contents to 70° C. 100 milligrams catalyst solid, slurried in 2 milliliters of hexane, was flushed in with 100 milliliters of propylene to start the reaction. After one hour, the reactor was cooled, vented, purged with $N_2$ for 20 minutes and then opened. The polypropylene was transferred to a glass dish and allowed to dry in a fume hood overnight. The next day the polymer was further dried in vacuo at 75° C. for one hour. The dried polymer was weighed.

Polymer Analysis: MFR was measured by the method of ASTM-1238 Condition L. Apparent Density is measured using the method of ASTM D-1895-89 Method A. Particle Size was measured by the method of ASTM D 1921-89 Method A. Molecular Weight (MW) and its distribution (MWD) was measured by GPC on a Waters 150-C at 145° C. using 1,2,4-trichlorobenzene as the solvent.

106.8 milligram of the solid prepared as described in Example 24 gave 334.1 grams polypropylene in 60 minutes. Productivity was 3128 g PP/g catalyst. Activity was 200.9 Kg PP/millimole Zr. Analysis showed the polymer to have the following properties: 25.8 MFR, 149532 g/mole MW and 1.82 dispersity.

Example 25

In the dry box under $N_2$ 0.0705 grams of rac-dimethylsilandiylbis(2-methyl-4-phenyl-1-indenyl) zirconium dichloride was placed in a 50 milliliter beaker and 4.55 grams of Methylalumoxane as a 30 % solution in toluene was added. The resulting metallocene solution was stirred for 30 minutes with a bar magnet. Then 14.0 grams of dried and $N_2$ purged toluene was added followed by another 5 minutes of stirring. Separately 5.00 grams of the fluorided silica prepared in Example 8 was transferred to a 150 milliliter beaker. The metallocene solution was added to the fluorided silica gel in three aliquots with stirring. The resulting slurry was stirred for an additional 60 minutes then the volatiles were removed under vacuum. Heat was applied to the drying catalyst until a final temperature of 50° C. was held for 60 minutes. The dried catalyst was 6.48 grams of a finely divided, free flowing solid. Elemental analysis showed 9.55% Al and 0.153% Zr. 109.8 milligram of the solid gave 326.3 grams polypropylene in 60 minutes. Productivity was 2972 g PP/g catalyst. Activity was 177.2 Kg PP/millimole Zr. Analysis showed the polymer to have the following properties: 577822 g/mole MW and 2.12 dispersity.

Comparative Example 11

In the dry box under $N_2$ 0.0532 grams of rac-dimethylsilandiylbis(2-methylindenyl) zirconium dichloride was placed in a 50 milliliter beaker and 4.56 grams of Methylalumoxane as a 30% solution in toluene was added. The resulting metallocene solution was stirred for 30 minutes with a bar magnet. Then 16.5 grams of dried and $N_2$ purged toluene was added followed by another 5 minutes of stirring. Separately 5.00 grams of the silica prepared in Comparative Example 3 was transferred to a 150 milliliter beaker. The metallocene solution was added to the silica gel in three aliquots with stirring. The resulting slurry was stirred for an additional 60 minutes then the volatiles were removed under vacuum. Heat was applied to the drying catalyst until a final temperature of 50° C. was held for 60 minutes. The dried catalyst was 6.67 grams of a finely divided, free flowing solid. Elemental analysis showed 9.12% Al and 0.128% Zr. 102.7 milligram of the solid gave 111.2 grams polypropylene in 60 minutes. Productivity was 1083 g PP/g catalyst. Activity was 77.2 Kg PP/millimole Zr. Analysis showed the polymer to have the following properties: 23.4 MFR, 143867 g/mole MW and 1.72 dispersity.

Comparative Example 12

In the dry box under $N_2$ 0.0709 grams of rac-dimethylsilandiylbis(2-methyl-4-phenyl-1-indenyl) zirconium dichloride was placed in a 50 milliliter beaker and 4.56 grams of Methylalumoxane as a 30% solution in toluene was added. The resulting metallocene solution was stirred for 30 minutes with a bar magnet. Then 16.5 grams of dried and $N_2$ purged toluene was added followed by another 5 minutes of stirring. Separately 5.00 grams of the silica prepared in Comparative Example 3 was transferred to a 150 milliliter beaker. The metallocene solution was added to the silica gel in three aliquots with stirring. The resulting slurry was stirred for an additional 60 minutes then the volatiles were removed under vacuum. Heat was applied to the drying catalyst until a final temperature of 50° C. was held for 60 minutes. The dried catalyst was 6.48 grams of a finely divided, free flowing solid. Elemental analysis showed 9.19% Al and 0.120% Zr. 103.3 milligram of the solid gave 82.9 grams polypropylene in 60 minutes. Productivity was 803 g PP/g catalyst. Activity was 61.0 Kg PP/ millimole Zr. Analysis showed the polymer to have the following properties: 689094 g/mole MW and 2.17 dispersity.

Comparison of the results detailed above shows that the dehydrated fluorided silica catalyst has more than double the activity of the dehydrated silica catalyst based on Zr contained.

The following examples show that metallocene catalysts prepared with a non-coordinating anion and using dehydrated fluorided silica as the support have higher activity compared to the same catalysts prepared using dehydrated silica.

Example 26

In the dry box under $N_2$ 5.00 grams of the fluorided silica prepared in Example 4 was transferred to a 250 milliliter flask containing a bar magnet. In a 50 milliliter beaker 0.18 grams N,N'-diethylaniline, available from Aldrich Chemical Company, Milwaukee Wis. was diluted with 18.0 milliliters of dried and $N_2$ purged hexane. This solution was added slowly to the silica with stirring to form a thick slurry. The slurry was diluted with 5.0 milliliters of hexane and heat applied as stirring continued. At the end of 30 minutes the temperature was 40° C. 0.55 grams of tris-perfluorophenylborane, available from Boulder Scientific Company, Mead, Colo. was added and the stirring—heating continued. After an additional 60 minutes the temperature was constant at 50° C. 0.06 grams of rac-dimethylsilandiylbis(2-methylindenyl) zirconium dimethyl was added and the stirring—heating continued. After 120 minutes heating was stopped and the slurry was permitted to settle. The supernatant was removed and the solids were dried under vacuum. Heat was applied as the catalyst dried until a final temperature of 30° C. was held for 60 minutes. The dried catalyst was 5.85 grams of a finely divided, free flowing solid. Elemental analysis showed 0.20% B and 0.21% Zr. 105.0 milligram of the solid gave 135.7 grams polypropylene in 60 minutes. Productivity was 1292 g PP/g catalyst. Activity was 56.1 Kg PP/millimole Zr. Analysis showed the polymer to have the following properties: 105024 g/mole MW and 1.96 dispersity.

Example 27

101.2 milligrams of the catalyst prepared in Example 26 was charged to the polymerization reactor containing hydrogen. 127.6 grams polypropylene was prepared in 60 minutes. Productivity was 1261 g PP/g catalyst. Activity was 54.8 Kg PP/millimole Zr. Analysis showed the polymer to have the following properties: 107642 g/mole MW and 2.03 dispersity.

Comparative Example 13

In a manner similar to Example 26 a catalyst was prepared except the silica of Comparative Example 3 was used. The dried catalyst was 5.75 grams of a finely divided, free flowing solid. Elemental analysis showed 0.19% B and 0.22% Zr. 103.6 milligram of the solid gave 8.7 grams polypropylene in 60 minutes. Productivity was 84 g PP/g catalyst. Activity was 3.5 Kg PP/millimole Zr. Analysis showed the polymer to have the following properties: 102315 g/mole MW and 2.04 dispersity.

Comparative Example 14

99.2 milligrams of the catalyst prepared in Comparative Example 13 was charged to the polymerization reactor containing hydrogen. 13.6 grams polypropylene was prepared in 60 minutes. Productivity was 137 g PP/g catalyst. Activity was 5.7 Kg PP/millimole Zr. Analysis showed the polymer to have the following properties: 91845 g/mole MW and 1.90 dispersity.

Comparison of the results detailed above shows that the dehydrated fluorided silica catalyst has on average about 1280 percent more activity than the dehydrated silica catalyst on a Zr basis.

Example 28

In the dry box under $N_2$ 5.01 grams of the fluorided silica prepared in Example 4 was transferred to a 250 milliliter flask containing a bar magnet. In a 50 milliliter beaker 0.18 grams N,N'-diethylaniline, available from Aldrich Chemical Company, Milwaukee Wis. was diluted with 18.0 milliliters of dried and $N_2$ purged hexane. This solution was added slowly to the silica with stirring to form a thick slurry. The slurry was diluted with 5.0 milliliters of hexane and heat applied as stirring continued. At the end of 30 minutes the temperature was 40° C. 0.55 grams of tris-perfluorophenylborane, available from Boulder Scientific Company, Mead, Colo. was added and the stirring—heating continued. After an additional 60 minutes the temperature was constant at 50° C. 0.08 grams of rac-dimethylsilandiylbis(2-methyl-4-phenyl-1-indenyl) zirconium dimethyl was added and the stirring—heating continued. After 120 minutes heating was stopped and the slurry was permitted to settle. The supernatant was removed and the solids were dried under vacuum. Heat was applied as the catalyst dried until a final temperature of 30° C. was held for 60 minutes. The dried catalyst was 5.84 grams of a finely divided, free flowing solid. Elemental analysis showed 0.22% B and 0.21% Zr. 101.6 milligram of the solid gave 155.3 grams polypropylene in 60 minutes. Productivity was 1529 g PP/g catalyst. Activity was 66.4 Kg PP/millimole Zr. Analysis showed the polymer to have the following properties: 529068 g/mole MW and 2.35 dispersity.

Example 29

102.5 milligrams of the catalyst prepared in Example 28 was charged to the polymerization reactor containing hydrogen. 237.0 grams polypropylene was prepared in 60 minutes. Productivity was 2312 g PP/g catalyst. Activity was 100.4 Kg PP/millimole Zr. Analysis showed the polymer to have the following properties: 474587 g/mole MW and 2.48 dispersity.

Comparative Example 15

In a manner similar to Example 28 a catalyst was prepared except the silica of Comparative Example 3 was used. The dried catalyst was 5.90 grams of a finely divided, free flowing solid. Elemental analysis showed 0.19% B and 0.18% Zr, 100.1 milligram of the solid gave 22.0 grams polypropylene in 60 minutes. Productivity was 220 g PP/g catalyst. Activity was 11.1 Kg PP/millimole Zr. Analysis showed the polymer to have the following properties: 579479 g/mole MW and 2.40 dispersity.

Comparative Example 16

105.1 milligrams of the catalyst prepared in Comparative Example 15 was charged to the polymerization reactor containing hydrogen. 120.7 grams polypropylene was prepared in 60 minutes. Productivity was 1148 g PP/g catalyst. Activity was 58.2 Kg PP/millimole Zr. Analysis showed the polymer to have the following properties: 529068 g/mole MW and 2.35 dispersity.

Comparison of the results detailed above shows that the dehydrated fluorided silica catalyst has on average about 380 percent more activity on a Zr basis than the dehydrated silica catalyst.

The following examples show that metallocene catalysts prepared with a non-coordinating anion and using other dehydrated fluorided silicas as the support also show high activity compared to the similar catalysts prepared using dehydrated silicas.

Example 30

In the dry box under $N_2$ 5.00 grams of the fluorided silica prepared in Example 2 was transferred to a 250 milliliter flask containing a bar magnet. In a 50 milliliter beaker 0.18 grams N,N'-diethylaniline, available from Aldrich Chemical Company, Milwaukee Wis. was diluted with 18.0 milliliters of dried and $N_2$ purged hexane was added. This solution was added slowly to the silica with stirring to form a thick slurry. The slurry was diluted with 5.0 milliliters of hexane and heat applied as stirring continued. At the end of 30 minutes the temperature was 40° C. 0.55 grams of tris-perfluorophenylborane, available from Boulder Scientific Company, Mead, Colo. was added and the stirring—heating continued. After an additional 60 minutes the temperature was constant at 50° C. 0.08 grams of rac-dimethylsilandiylbis(2-methyl-4-phenyl-1-indenyl) zirconium dimethyl was added and the stirring—heating continued. After 120 minutes heating was stopped and the slurry was permitted to settle. The supernatant was removed and the solids were dried under vacuum. Heat was applied as the catalyst dried until a final temperature of 30° C. was held for 60 minutes. The dried catalyst was 5.69 grams of a finely divided, free flowing solid. Elemental analysis showed 0.22% B and 0.18% Zr.

Examples 31 through 39

In a manner similar to Example 30 catalysts were prepared on other 500° C. fluorided silicas. The details are shown in Table 4. The polymerization results are shown in Tables 5 and 6.

TABLE 4

Catalysts Prepared on 500° C. Fluorided Silicas

| Catalyst Example | Fluorided Silica Example | Loading[1] | | Elemental Analysis | |
|---|---|---|---|---|---|
| | | B | Zr | % B | % Zr |
| 31 | 3 | 0.21 | 0.026 | 0.18 | 0.18 |
| 32 | 5 | " | " | 0.18 | 0.17 |
| 33 | 6 | " | " | n.d. | n.d. |
| 34 | 7 | " | " | 0.16 | 0.12 |
| 35 | 8 | 0.22 | 0.028 | 0.37 | 0.22 |
| 36 | 8 | 0.13 | 0.027 | 0.35 | 0.21 |
| 37 | 11 | 0.21 | " | 0.19 | 0.19 |
| 38 | 11 | 0.13 | " | 0.13 | 0.22 |
| 39 | 14 | 0.21 | 0.026 | 0.23 | 0.24 |

[1]units are millimole reagent per gram of silica

TABLE 5

Polymerization Results for Catalyst on 500° C. Fluorided Silicas

| Catalyst Example | Productivity (g PP/g Catalyst-Hr) | Activity (Kg PP/mM Zr-Hr) |
|---|---|---|
| 31 | 555 | 24.8 |
| 32 | 3267 | 136.5 |
| 33 | 723 | 30.6 |
| 34 | 49 | 2.1 |
| 35 | 3330 | 133.3 |
| 36 | 3258 | 135.4 |
| 37 | 780 | 33.4 |
| 38 | 490 | 20.5 |
| 39 | 725 | 32.9 |

TABLE 6

Polymerization Results for Catalyst on 500° C. Fluorided Silicas[1]

| Catalyst Example | Productivity (g PP/g Catalyst-Hr) | Activity (Kg PP/mM Zr-Hr) |
|---|---|---|
| 31 | 2083 | 93.1 |
| 32 | 3353 | 140.1 |
| 33 | 919 | 38.8 |
| 34 | 365 | 15.5 |
| 35 | 5180 | 207.3 |
| 36 | 3496 | 145.3 |
| 37 | 2004 | 85.8 |
| 38 | 1820 | 76.0 |
| 39 | 2435 | 110.7 |

[1] hydrogen added to the reactor

Examples 40 through 47.

In a manner similar to Example 30 catalysts were prepared on other 300° C. fluorided silicas. The details are shown in Table 7. The polymerization results are shown in Table 8 and 9.

TABLE 7

Catalysts Prepared on 300° C. Fluorided Silicas

| Catalyst Example | Fluorided Silica Example | Loading[1] B | Loading[1] Zr | Elemental Analysis % B | Elemental Analysis % Zr |
|---|---|---|---|---|---|
| 40 | 17 | 0.21 | 0.026 | 0.20 | 0.22 |
| 41 | 18 | " | " | 0.18 | 0.20 |
| 42 | 16 | " | 0.027 | 0.22 | 0.19 |
| 43 | 16 | 0.13 | " | 0.11 | 0.19 |
| 44 | 19 | 0.21 | " | 0.21 | 0.20 |
| 45 | 20 | " | " | 0.13 | 0.16 |
| 46 | 20 | 0.13 | " | 0.09 | 0.20 |
| 47 | 21 | 0.21 | 0.026 | 0.37 | 0.21 |

[1] units are millimole reagent per gram of silica

TABLE 8

Polymerization Results for Catalysts on 300° C. Fluorided Silicas

| Catalyst Example | Productivity (g PP/g Catalyst-Hr) | Activity (Kg PP/mM Zr-Hr) |
|---|---|---|
| 40 | 310 | 13.4 |
| 41 | 1041 | 45.2 |
| 42 | 511 | 22.0 |
| 43 | 615 | 25.3 |
| 44 | 2655 | 113.5 |
| 45 | 2897 | 119.7 |
| 46 | 1927 | 77.0 |
| 47 | 428 | 18.6 |

TABLE 9

Polymerization Results for Catalysts on 300 ° C. Fluorided Silicas[1]

| Catalyst Example | Productivity (g PP/g Catalyst-Hr) | Activity (Kg PP/mM Zr-Hr) |
|---|---|---|
| 40 | 1150 | 49.8 |
| 41 | 1125 | 48.8 |
| 42 | 1433 | 61.6 |
| 43 | 1172 | 48.2 |
| 44 | 2603 | 111.2 |
| 45 | 3060 | 126.4 |
| 46 | 2603 | 111.2 |
| 47 | 1137 | 49.4 |

[1] hydrogen added to the reactor

Comparative Examples 17 through 23

In a manner similar to Example 30 catalysts were prepared except dehydrated silicas were used. The details are shown in Table 10. The polymerization results are shown in Tables 11 and 12.

TABLE 10

Catalysts Prepared on Dehydrated Silicas

| Catalyst Comp. Example | Dehydrated Silica Comp. Example | Loading[1] B | Loading[1] Zr | Elemental Analysis % B | Elemental Analysis % Zr |
|---|---|---|---|---|---|
| 17 | 1 | 0.12 | 0.014 | 0.14 | 0.11 |
| 18 | 2 | 0.43 | 0.027 | 0.35 | 0.19 |
| 19 | 2 | 0.21 | " | 0.21 | 0.22 |
| 20 | 3 | " | 0.026 | 0.19 | 0.18 |
| 21 | 3 | 0.13 | 0.027 | 0.11 | 0.20 |
| 22 | 5 | 0.21 | 0.026 | 0.21 | 0.22 |
| 23 | 5 | 0.13 | 0.027 | 0.11 | 0.21 |

[1] units are millimole reagent per gram of silica

TABLE 11

Polymerization Results for Catalysts on Dehydrated Silicas

| Catalyst Comp. Example | Productivity (g PP/g Catalyst-Hr) | Activity (Kg PP/mM Zr-Hr) |
|---|---|---|
| 18 | 400 | 19.4 |
| 19 | 258 | 11.3 |
| 20 | 220 | 9.6 |
| 21 | 165 | 7.0 |
| 22 | 144 | 6.4 |
| 23 | 85 | 3.7 |

TABLE 12

Polymerization Results for Catalysts on Dehydrated Silicas[1]

| Catalyst Comp. Example | Productivity (g PP/g Catalyst-Hr) | Activity (Kg PP/mM Zr-Hr) |
|---|---|---|
| 17 | 504 | 41.8 |
| 18 | 357 | 17.1 |
| 19 | 621 | 27.2 |
| 20 | 1148 | 52.0 |
| 21 | 768 | 32.4 |
| 22 | 495 | 22.1 |
| 23 | 541 | 23.5 |

[1]hydrogen added to the reactor

The following example shows that a metallocene catalyst prepared with a non-coordinating anion on a chemically dehydrated silica does not have the high activity of a similar catalyst prepared on a fluorided dehydrated silica.

Comparative Example 24

In a manner similar to Example 30 catalyst was prepared except the hexamethyldisilazane treated silica of Comparative Example 6 was used. The dried catalyst was 6.70 grams of a finely divided, free flowing solid. Elemental analysis showed 0.29% B and 0.17% Zr. 100.8 milligram of the solid gave 6.7 grams polypropylene in 60 minutes. Productivity was 66.5 g PP/g catalyst. Activity was 3.6 Kg PP/millimole Zr.

The following example shows that a metallocene catalyst prepared with a non-coordinating anion on an alternately fluorided silica does not have the high activity of a similar catalyst prepared on a fluorided dehydrated silica.

Comparative Example 25

In a manner similar to Example 30 catalyst was prepared except the dimethylamine sulfur trifluoride treated silica of Comparative Example 7 was used. The dried catalyst was 5.36 grams of a finely divided, free flowing solid. Elemental analysis showed 0.095% B and 0.096% Zr. 98.7 milligram of the solid was added to the polymerization reactor to test activity. The solid was inactive for propylene polymerization.

The following examples show that metallocene catalysts prepared with a non-coordinating anion on a dehydrated silica halogenated with the congeners of fluorine do not have the high activity of a similar catalyst prepared on a dehydrated fluorided silica.

Comparative Example 26

In a manner similar to Example 30 catalyst was prepared except the ammonium chloride halogenated silica of Comparative Example 8 was used. The dried catalyst was 5.52 grams of a finely divided, free flowing solid. Elemental analysis showed 0.12% B and 0.11% Zr. 99.3 milligram ofthe solid was added to the polymerization reactor to test activity. The solid was inactive for propylene polymerization.

Comparative Example 27

In a manner similar to Example 30 catalyst was prepared except the ammonium bromide halogenated silica of Comparative Example 9 was used. The dried catalyst was 5.61 grams of a finely divided, free flowing solid. Elemental analysis showed 0.11% B and 0.16% Zr. 99.7 milligram of the solid was added to the polymerization reactor to test activity. The solid was inactive for propylene polymerization.

The following Examples show that the advantages of using fluorided silica as a catalyst support are not lost or diminished when larger quantities are fluorided nor is the high activity of the resulting catalysts compromised when a continuous polymerization process is used.

Example 48

A fluorided silica was prepared by Grace Davison from Sylopol®9522 and ammonium hexafluorosilicate according to the procedure of Example 1. Elemental analysis showed the fluorine content to be 1.49±0.06% by weight. Moreover the fluorided silica gel had the following properties: 1.69 cc/g pore volume, 256 m$^2$/g surface area and 35 microns average particle size. In the dry box under $N_2$ 401 grams of this silica was transferred to a 4 liter flask. 6.4 grams N,N'-diethylaniline was combined with 1542 grams dried and $N_2$ sparged hexane . All the liquid was added to the silica. The slurry was mechanically stirred and heat applied. After 30 minutes 21.61 grams tris-perfluorophenylborane was added. After 60 minutes 3.20 grams of rac-dimethylsilandiylbis(2-methyl-4-phenyl-1-indenyl) zirconium dimethyl was added. The slurry temperature was 50° C. During the next 120 minutes stirring continued and a final temperature of 51° C. was reached. At this time heating was stopped and the slurry was permitted to settle. The clear, colorless supernatant was removed and found to have less than 4 PPM Zirconium or Boron and 6 PPM N. The total amount of supernatant removed before drying was 575.4 grams. The solids were dried under vacuum. Heat was applied as the catalyst dried until the free flowing solid was held at a final temperature of 30° C. for 120 minutes. The dried catalyst was 423.8 grams. Elemental analysis showed 0.101 % B and 0.114 % Zr. 102.6 milligram of the solid was charged to the polymerization batch reactor at 70° C. along with about 5 millimole $H_2$. Yield was 199 grams polypropylene in 35 minutes. Productivity per hour was 3326 g PP/g catalyst. Activity per hour was 266 Kg PP/millimole Zr. Analysis showed the polymer to have the following properties: 0.42 g/ml apparent density, 352052 g/mole MW and 2.34 dispersity.

Example 48A

Continuous Polymerization

The polymerization was conducted in liquid propylene, in a pilot scale polymerization process employing two reactors in series. The reactors were equipped with jackets for removing the heat of polymerization. The reactor temperature was set at 74° C. in the first reactor and 68° C. in the second reactor. The catalyst prepared as described above was fed at a rate of 1–2 g/hr. A 1 wt % TEAL in hexane solution was fed at a rate of 4–5 cc/min. Propylene was fed at a rate of about 80 kg/hr to the first reactor and about 27 kg/hr to the second reactor. Hydrogen concentration in the first reactor was 1000 mppm and 1300 mppm in the second. Residence times were about 2.5 hours in the first reactor and about 1.9 hours in the second reactor. The production rate of polymer from the reactors was about 40 kg/hr. Catalyst Productivity was calculated from the total weight of polymer made and the total weight of catalyst used. Productivity for Catalyst of Example 48 was 20.5 Kg/g catalyst and activity was 1639 Kg/millimole Zr. The polymer was discharged from the reactors as a granular product having the following properties: 2.62 MFR, apparent density of 0.46 g/cm$^3$ and average particle size of 999.3 microns.

Examples 49 through 52

Examples 49 through 52 were generated in a manner similar to the continuous polymerization described in Example 48A, except that polymerization was allowed to occur at various levels of hydrogen. The data are shown in Table 13.

TABLE 13

Continuous Polymerization Results for Catalyst Example 48

| Example | H$_2$ Reactor 1 (mppm)[1] | H$_2$ Reactor 2 (mppm) | Productivity (Kg/g catalyst) | MFR | AD (g/cm$^3$) | APS (microns) |
|---|---|---|---|---|---|---|
| 49 | 2200 | 2900 | 27.0 | 17.4 | 0.45 | 981.2 |
| 50 | 2500 | 3150 | 25.8 | 25.8 | 0.47 | 1001.0 |
| 51 | 4400 | 5050 | 22.0 | 172.5 | 0.45 | 925.5 |
| 52 | 7300 | 8800 | 15.2 | 1324 | 0.45 | 848.0 |

[1]molar parts per million.

The following Examples show that the advantages of using fluorided silica as a catalyst support are reproducible.

Example 53

A second fluorided silica was prepared by Grace Davison from Sylopol®9522 and ammonium hexafluorosilicate according to the heat schedule of Example 1. Elemental analysis showed the fluorine content to be 2.35±0.05% by weight. The fluorided silica gel had the following properties: 1.62 cc/g pore volume, 243 m$^2$/g surface area and 39 microns average particle size. In the dry box under N$_2$ 465.4 grams of this silica was transferred to a 4 liter flask. 7.5 grams N,N'-diethylaniline was combined with 1800grams dried and N$_2$ sparged hexane. All the liquid was added to the silica. The slurry was mechanically stirred and heat applied. At the 30 minute mark the temperature was 50.8° C. and 25.2 grams tris-perfluorophenylborane was added. After 60 minutes the temperature was 53° C. and 3.70 grams of rac-dimethylsilandiylbis(2-methyl-4-phenyl-1-indenyl) zirconium dimethyl was added. During the next 120 minutes stirring continued and a final temperature of 55° C. was reached. At this time heating was stopped and the slurry was permitted to settle. The clear, colorless supernatant was removed and found to weigh 404.7 grams. The solids were dried under vacuum. Heat was applied as the catalyst dried until the free flowing solid was held at a final temperature of 35° C. for 120 minutes. The dried catalyst was 486.93 grams. Elemental analysis showed 0.10 % B and 0.11 % Zr.

Examples 54 through 58

Using the supported catalyst of Example 53, a series of batch polymerization runs were made as described in Example 48. The results are shown in Table 14.

TABLE 14

Batch Polymerization Results for Catalyst Example 53[1]

| Example | Time (hr) | Productivity/Hr (Kg/g catalyst-hr) | MFR | AD (g/cm$^3$) | APS (microns) |
|---|---|---|---|---|---|
| 54 | 0.5 | 5305 | n.d.[2] | 0.34 | 849 |
| 55 | 1.0 | 4917 | 97 | 0.41 | 570 |
| 56 | 1.0 | 5146 | 88 | 0.40 | 678 |
| 57 | 1.0 | 6012 | 14 | 0.38 | 734 |
| 58 | 2.0 | 3466 | 53 | 0.40 | 702 |

[1]Hydrogen added to the reactor

Examples 59 through 62

Using the supported catalyst described in Example 53, a series of continuous polymerization runs, as described in Example 48A, were made. The data are shown in Table 15.

TABLE 15

Continuous Polymerization Results for Catalyst Example 53

| Example | H$_2$ Reactor 1 (mppm)[1] | H$_2$ Reactor 2 (mppm) | Productivity (Kg/g catalyst) | Activity (Kg/mM Zr) | MFR | AD (g/cm$^3$) | APS (microns) |
|---|---|---|---|---|---|---|---|
| 59 | 2500 | 3200 | 46.3 | 3880.7 | 11.4 | 0.43 | 1219 |
| 60 | 2600 | 3600 | 55.0 | 4601.9 | 15.8 | 0.47 | 1019 |
| 61 | 3300 | 3800 | 44.8 | 3748.9 | 27.8 | 0.46 | 1077 |
| 62 | 3700 | 4300 | 46.2 | 3872.1 | 37.1 | 0.47 | 1144 |

[1]molar parts per million.

Discussion

Although the above Examples deal primarily with metallocene supported catalyst composition, it will be recognized that the attributes of the polymers produced by the metallocene supported catalyst composition of the present invention will lend themselves to use in end-product applications. Examples of such end-product applications include, articles made from films, thermoforming and blow molding, fibers, such as meltblown fibers and spunbond fibers, and fabrics.

While the present invention has been described and illustrated by reference to particular embodiments, it will be appreciated by those of ordinary skill in the art that the invention lends itself to many different variations not illustrated herein. For these reasons, then, reference should be made solely to the appended claims for purposes of determining the true scope of the present invention.

Although the appendant claims have single appendencies in accordance with U.S. patent practice, each of the features in any of the appendant claims can be combined with each of the features of other appendant claims or the main claim.

What is claimed is:

1. A supported catalyst comprising: a fluorided support composition having a fluorine concentration in the range of from 0.01 to 10.0 millimoles of fluorine per gram of support; a non-coordinating anion bound to the fluorided support composition; and a metallocene, wherein the supported catalyst is made by the process comprising:
   (a) contacting a support with a fluoriding agent at from 100° C. to 1000° C. to produce a fluorided support composition, wherein the support is selected from the group consisting of talc, clay, silica, alumina, magnesia, zirconia, iron oxides, boria, calcium oxide, zinc oxide, barium oxide thoria, aluminum phosphate gel, polyvinylchloride and substituted polystyrene; and
   (b) contacting the fluorided support composition with a non-coordinating anion and a metallocene.

2. The supported catalyst of claim 1, wherein the non-coordinating anion is selected from the group consisting of highly fluorinated tris-arylborane compounds and mixtures thereof.

3. The supported catalyst of claim 1, wherein the non-coordinating anion is selected from the group consisting of tris-perfluorophenyl borane, trisperfluoronaphthyl borane, trisperfluorobiphenyl borane, tris(3,5-di(trifluoromethyl)phenyl)borane, tris(di-t-butylmethylsilyl)perfluorophenylborane, and mixtures thereof.

4. The supported catalyst of claim 1, wherein the metallocene is represented by the following:

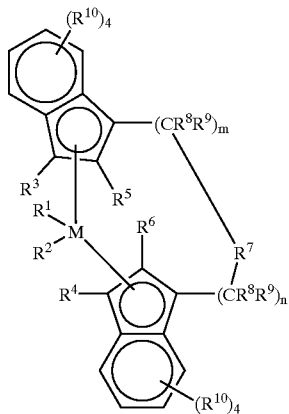

wherein M is a metal of Group 4, 5, or 6 of the Periodic Table;

$R^1$ and $R^2$ are identical or different, and are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^5$ and $R^6$ are identical or different, are one of a halogen atom, a $C_1$–$C_{10}$ alkyl group, which may be halogenated, a $C_6$–$C_{10}$ aryl group, which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

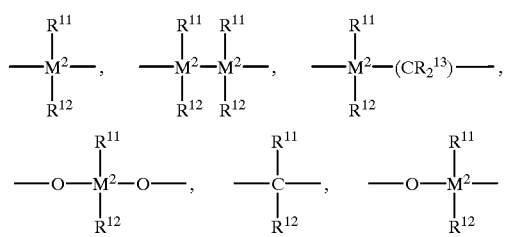

—$B(R^{11})$—, —$Al(R^{11})$—, —Ge—, —Sn—, —O—, —S—, —SO—, —$SO_2$—, —$N(R^{11})$—, —CO—, —$P(R^{11})$—, or —$P(O)(R^{11})$—;
wherein $R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, or a $C_7$–$C_{40}$ alkylaryl group; and wherein $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^3$, $R^4$, and $R^{10}$ are identical or different and have the meanings stated for $R^{11}$, $R^{12}$ and $R^{13}$.

5. The supported catalyst of claim 1 wherein the metallocene is selected from the group consisting of Dimethylsilandiylbis (2-methyl-4- phenyl-1-indenyl) zirconium dimethyl; Dimethylsilandiylbis(2-methyl-4,5- benzoindenyl) zirconium dimethyl; Dimethylsilandiylbis(2-methyl-4,6-diisopropylindenyl) zirconium dimethyl; Dimethylsilandiylbis(2-ethyl-4- phenyl-1-indenyl) zirconium dimethyl; Dimethylsilandiylbis (2-ethyl-4- naphthyl-1-indenyl) zirconium dimethyl; Dimethylsilandiylbis(2-methyl 4-(1-naphthyl)-1-indenyl) zirconium dimethyl; Dimethylsilandiylbis(2- methyl-4-(2-naphthyl)-1-indenyl) zirconium dimethyl; Dimethylsilandiylbis(2-methyl-indenyl) zirconium dimethyl; Dimethylsilandiy1bis(2-methyl-4,5-diisopropyl-1-indenyl) zirconium dimethyl; Dimethylsilandiylbis(2,4,6-trimethyl-1-indenyl) zirconium dimethyl; Dimethylsilandiylbis(2-methyl-1-indenyl) zirconium dimethyl; Dimethylsilandiylbis(2-ethyl-1-indenyl) zirconium dimethyl; Dimethylsilandiylbis(2,5,6-trimethyl-1-indenyl) zirconium dimethyl; Dimethylsilandiylbis (2-methyl-4-phenyl-1-indenyl) zirconium dichloride; Dimethylsilandiylbis(2-methyl-4,5-benzoindenyl) zirconium dichloride; Dimethylsilandiylbis(2-methyl-4,6-diisopropylindenyl) zirconium dichloride; Dimethylsilandiylbis(2-ethyl-4-phenyl-1-indenyl) zirconium dichloride; Dimethylsilandiylbis(2-ethyl-4-naphthyl-1-indenyl) zirconium dichloride; Dimethylsilandiylbis(2-methyl-4-(1-naphthyl)-1-indenyl) zirconium dichloride; Dimethylsilandiylbis(2-methyl-4-(2-naphthyl)1- indenyl) zirconium dichloride; Dimethylsilandiylbis(2-methyl-1-indenyl) zirconium dichloride; Dimethylsilandiylbis(2-methyl-4,5-diisopropyl-1- indenyl) zirconium dichloride; Dimethylsilandiylbis(2,4,6-trimethyl-1- indenyl) zirconium dichloride; Dimethylsilandiylbis(2-methyl-1-indenyl) zirconium dichloride; Dimethylsilandiylbis(2-ethyl-1-indenyl) zirconium dichloride, and Dimethylsilandiylbis(2,5,6-trimethyl-1-indenyl) zirconium dichloride, and mixtures thereof.

6. The supported catalyst of claim 1, having a fluorine concentration in the range of from 0.6 to 3.5 wt % of the support.

7. A supported catalyst comprising a fluorided silica having a fluorine concentration in the range of from 0.01 to 10.0 millimoles of fluorine per gram of support; a non-coordinating anion bound to the fluorided silica; and a metallocene.

8. The support of claim 7 wherein the titanium, zirconium or halfnium metallocene is selected from the group consisting of Dimethylsilandiylbis (2-methyl-4-phenyl-1-indenyl) zirconium dimethyl; Dimethylsilandiylbis(2-methyl-4,5- benzoindenyl) zirconium dimethyl; Dimethylsilandiylbis(2-methyl-4,6-diisopropylindenyl) zirconium dimethyl; Dimethylsilandiylbis(2-ethyl-4-phenyl-1-indenyl) zirconium dimethyl; Dimethylsilandiylbis (2-ethyl-4-naphthyl-1-indenyl) zirconium dimethyl; Dimethylsilandiylbis(2-methyl-4-(1-naphthyl)-1-indenyl) zirconium dimethyl; Dimethylsilandiylbis(2-methyl-4-(2-naphthyl)-1- indenyl) zirconium dimethyl; Dimethylsilandiylbis(2-methyl-indenyl) zirconium dimethyl; Dimethylsilandiylbis(2-methyl-4,5-diisopropyl-1- indenyl) zirconium dimethyl; Dimethylsilandiylbis(2,4,6-trimethyl-1- indenyl) zirconium dimethyl; Dimethylsilandiylbis(2-methyl-1-indenyl) zirconium dimethyl; Dimethylsilandiylbis(2-ethyl-1-indenyl) zirconium dimethyl; Dimethylsilandiylbis(2,5,6-trimethyl-1-indenyl) zirconium dimethyl; Dimethylsilandiylbis (2-methyl-4-phenyl-1-indenyl) zirconium dichloride; Dimethylsilandiylbis(2-methyl-4,5-benzoindenyl) zirconium dichloride; Dimethylsilandiylbis(2-methyl-4,6-diisopropylindenyl) zirconium dichloride; Dimethylsilandiylbis(2-ethyl-4-phenyl-1-indenyl) zirconium dichloride; Dimethylsilandiylbis (2-ethyl-4-naphthyl-1-indenyl) zirconium dichloride; Dimethylsilandiylbis(2-methyl-4-(1-naphthyl)-1- indenyl) zirconium dichloride; Dimethylsilandiylbis(2methyl-4-(2- naphthyl)-1-indenyl) zirconium dichloride; Dimethylsilandiylbis(2- methyl-indenyl) zirconium dichloride; Dimethylsilandiylbis(2-methyl-4,5- diisopropyl-1-indenyl) zirconium dichloride; Dimethylsilandiylbis(2,4,6- trimethyl-1-indenyl) zirconium dichloride; Dimethylsilandiylbis(2- methyl-1-indenyl) zirconium dichloride; Dimethylsilandiylbis(2-ethyl-1- indenyl) zirconium dichloride, and Dimethylsilandiylbis(2,5,6-trimethyl- 1-indenyl) zirconium dichloride, and mixtures thereof.

9. The supported catalyst of claim 7, wherein the non-coordinating anion is selected from the group consisting of highly fluorinated tris-arylborane compounds and mixtures thereof.

10. The supported catalyst of claim 7, wherein the non-coordinating anion is selected from the group consisting of tris-perfluorophenyl borane, trisperfluoronaphthyl borane, trisperfluorobiphenyl borane, tris(3,5- di(trifluoromethyl)phenyl)borane, tris(di-t-butylmethylsilyl)perfluorophenylborane, and mixtures thereof.

11. The supported catalyst of claim 7, having a fluorine concentration in the range of from 0.6 to 3.5 wt % of the support.

12. The supported catalyst of claim 7, wherein the silica and a fluoriding agent are contacted with one another at from 100° C. to 1000° C. to produce a fluorided support composition.

13. The supported catalyst of claim 12, wherein the fluoriding agent is selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$ and mixtures thereof.

14. A supported catalyst comprising a fluorided silica having a fluorine concentration in the range of from 0.01 to 10.0 millimoles of fluorine per gram of support; a non-coordinating anion bound to the fluorided silica; and a metallocene bound to the fluorided silica and non-coordinating anion; and wherein the non-coordinating anion is selected from highly fluorinated tris-arylborane compounds and mixtures thereof.

15. The supported catalyst of claim 14, wherein the non-coordinating anion is selected from the group consisting of tris-perfluorophenyl borane, trisperfluoronaphthyl borane, trisperfluorobiphenyl borane, tris(3,5-di(trifluoromethyl)phenyl)borane, tris(di-t-butylmethylsilyl)perfluorophenylborane, and mixtures thereof.

16. The supported catalyst of claim 14, wherein the metallocene is represented by the following:

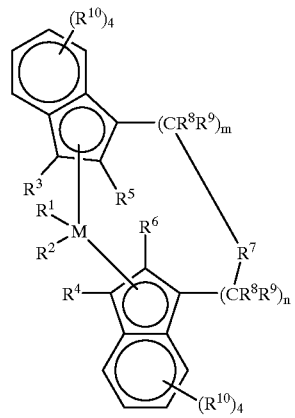

wherein M is titanium, zirconium, or halfnium;

$R^1$ and $R^2$ are identical or different, and are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ ; aryloxy group, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^5$ and $R^6$ are identical or different, are one of a halogen atom, a $C_1$–$C_{10}$ alkyl group, which may be halogenated, a $C_6$–$C_{10}$ aryl group, which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

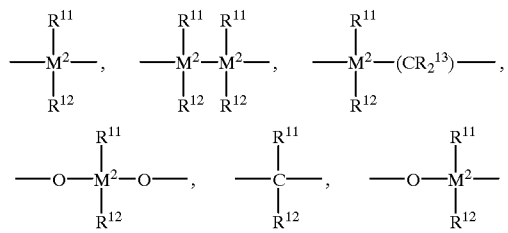

—$B(R^{11})$—, —$Al(R^{11})$—, —Ge—, —Sn—, —O—, —S—, —SO—, —$SO_2$—, —$N(R^{11})$—, —CO—, —$P(R^{11})$—, or —$P(O)(R^{11})$—;

wherein $R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, or a $C_7$–$C_{40}$ alkylaryl group; and wherein $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^3$, $R^4$, and $R^{10}$ are identical or different and have the meanings stated for $R^{11,}$ $R^{12}$ and $R^{13}$.

17. The supported catalyst of claim 14, having a fluorine concentration in the range of from 0.6 to 3.5 wt % of the support.

* * * * *